United States Patent Office 3,004,598
Patented Oct. 17, 1961

3,004,598
METHOD OF REDUCING THE PERMEABILITY OF UNDERGROUND FORMATIONS
Joe Ramos and Wayne F. Hower, Duncan, Okla., assignors, by mesne assignments, to Gulf Research & Development Company, Pittsburgh, Pa., a corporation of Delaware
No Drawing. Filed May 14, 1958, Ser. No. 735,118
7 Claims. (Cl. 166—29)

This invention relates generally to methods of reducing the permeability of underground formations penetrated by bore holes and, more particularly, to a method of forming deposits or precipitates in the pore spaces or channels of such formations in order to at least partially obstruct or block the flow of fluids therethrough.

One application wherein the invention has particular advantages is in connection with the gas repressuring of oil fields. The underground strata in such fields commonly includes zones having varying permeabilities and it is often desirable to obstruct or block the flow of fluids into and through the more permeable zones thereof.

Gas repressuring is usually performed in an oil field as a secondary recovery operation, such as after the point of depletion using primary methods of production has been reached and oil is no longer flowing in commercial quantities. In such fields, the underground strata is commonly penetrated by several wells, one or more of which serve as injection or input wells and the remainder of which may serve as production or output wells. Gas is injected under artificial pressure into an input well and then into an adjoining oil-bearing formation traversed by both input and output wells. The gas is in effect a driving fluid which sweeps or moves oil from the oil-bearing formations into one or more nearby output wells. The gas is usually circulated continuously into and through the formation and is believed to move the oil by viscous drag rather than by direct displacement.

When the gas repressuring operation is commenced, oil without objectionable quantities of gas may for a certain period of time appear at the output wells, indicating that the efficiency of the operation is initially relatively high. As gas is continuously circulated into and through the producing formation, the oil saturation thereof is decreased, the oil usually being removed first from the more permeable zones. The injected gas is usually a non-wetting phase, and passes into and through pore spaces and channels already opened by the previous removal of oil. As the operation continues and oil is removed, there occurs a continuous increase in the number of open pore spaces and channels through which the gas is circulated. As a result, an increasingly larger portion of the injected gas is permitted to by-pass the zones containing oil. After the operation has been conducted for a period of time, it is not unusual to find that there has occurred a very large increase in the gas-oil ratio of fluids reaching the output wells, indicating that a large percentage of the energy applied to remove oil is being wasted due to gas passing through the more permeable zones no longer containing oil.

Another application of this invention is to stop the flow of fluids into a borehole while the hole is being drilled with a gas as a circulating medium. An extremely serious problem encountered when drilling with gas as a circulating medium is entrance of water into the borehole. The water causes the cuttings to ball up, thereby making it difficult to remove them from the borehole and causing danger of sticking the drill pipe.

It is an object of the present invention to provide an improved method of reducing the permeability of underground formations penetrated by bore holes, by forming in the pore spaces or channels of such formations insoluble deposits or precipitates which at least partially obstruct or block the flow of fluids therethrough.

It is another object of the present invention to provide an improved method of forming insoluble deposits or precipitates in the more permeable zones of underground strata having zones of varying permeabilities.

It is a further object of the present invention to provide an improved method of preferentially reducing the permeability of underground formations in such manner as to prevent or reduce the flow of fluids through the more permeable zones thereof without substantially reducing the permeability of the less permeable zones thereof.

In accordance with the invention, it is proposed to attain the foregoing and other objects and advantages by injecting into an underground permeable formation, such as into a partially depleted oil-bearing formation in an oil field undergoing gas repressuring, an aqueous solution of a salt of a metal and a gas capable of reacting with the solution to form substantially instantaneously insoluble precipitates in the pore spaces or channels of the formation. The insoluble precipitates contain the metal ion of the metal salt. The aqueous solution and the reactant gas are separately injected into the formation, the solution being preferably injected first, and sufficient quantities are injected so that deposits or precipitates are formed in the required amount to at least partially obstruct or block the flow of fluids into and through the more permeable zones of the formation. The reactant gas also may be injected into the formation before the injection of the aqueous solution or both before and after the injection of the aqueous solution.

In one way of proceeding, the aqueous solution is prepared at or near the well site by dissolving a metal salt, such as aluminum sulfate, in water. If desired, the aqueous solution may be prepared at a remote location and brought to the well site in suitable containers. The solution is then introduced into an input well through tubing or the like extending downwardly to the formation containing oil. Preferably a well packer is expanded into engagement with the wall of the bore hole at or near the upper limit of the zone or formation to be treated so as to provide a fluid-tight seal preventing the solution from escaping along the annular space surrounding the tubing. In some applications it may be necessary or desirable to employ another well packer at or near the lower limit of the zone or formation to be treated.

The aqueous solution is displaced from the tubing by applying hydrostatic pressure and is forced into the formation, preferably at a pressure sufficiently low to allow the solution to penetrate into the more permeable zones of the formation. It is preferred to displace the solution from the tubing or borehole into the formation with an inert gas to prevent formation in the borehole of a precipitate which would obstruct entrance of the reactant gas into the formation. Where the formation has previously been subjected to gas repressuring, the desirable solution injection pressure at the formation will usually be less than the pressure which was used to inject the driving gas into the formation.

After the solution has been displaced from the tubing, there is introduced therein a treating gas, which is under artificial pressure. It is essential that the reactant gas be in the gaseous state to avoid mere displacement of the aqueous solution by the subsequent injection of a second liquid. To insure maintaining a gaseous state, the treating gas may be mixed with the driving gas, ordinarily natural gas or lease gas, injected in connection with the gas repressuring operation, or, as an alternative, may be mixed with compressed air or nitrogen. The treating gas is selected so as to be capable of reacting with the previously injected aqueous solution in situ to form insoluble deposits or precipitates in the pore spaces or channels of the formation.

Where the aqueous solution is a solution of aluminum sulfate in water, the treating gas reacting with it may be ammonia gas. Ammonia gas is readily available in cylinders and care should be taken to insure that the injection pressure of the natural gas or air with which the ammonia gas is mixed is sufficiently low so that the ammonia gas enters the injection stream. In this connection, ammonia gas exhibits the following pressures at the following temperatures:

| Temperature: | Pressure p.s.i. |
|---|---|
| 75° F | 140.5 |
| 80° F | 153.1 |
| 85° F | 166.4 |
| 90° F | 180.7 |
| 95° F | 195.8 |

The proportions of inert gas and ammonia are controlled to maintain the partial pressure of ammonia in the gaseous mixture below the vapor pressure of ammonia at the temperature in the formation to prevent condensation of the ammonia. It is preferred to mix the inert gas and ammonia in proportions that will preclude condensation of the ammonia at any temperature the mixture will encounter as it is displaced down the well.

As the mixture containing ammonia gas is circulated into the formation, it contacts the previously injected aluminum sulfate solution and an aluminum hydroxide deposit or precipitate of aluminum hydroxide is formed. This precipitate is insoluble and is formed as a reaction product of the ammonia gas and aluminum sulfate solution. The ammonia gas rapidly reacts with the aluminum sulfate in the aqueous solution to produce the aluminum hydroxide precipitate.

The quantities of aluminum sulfate solution and ammonia gas which will be required for a particular operation can best be determined by experience. Generally, it is preferable to first apply a more or less arbitrary quantity, and then make another application if the formation is not plugged sufficiently. It is suggested that sufficient aluminum sulfate solution be prepared to provide with the ammonia gas about a 100 gallon application, but experience may show that more or less will generally be required for treating particular wells. The vertical extent of the bore hole that is to be treated will, of course, be of primary importance in determining the quantities of reagents required.

The aluminum sulfate may be regular commercial grade which has 18 molecules of water of crystallization, and about 238 pounds is required to be dissolved in 85.7 gallons of water to provide a 100 gallon application when used with 50 pounds of ammonia gas, this formula allowing about a 38% excess of ammonia gas to assure complete precipitation.

Various other aqueous solutions may be used instead of the aluminum sulfate solution. For example, a ferric chloride solution may be prepared, using about 151 pounds of ferric chloride dissolved in 90.6 gallons of water to provide a 100 gallon application when used with 50 pounds of ammonia gas, again allowing an excess of ammonia gas.

Also, various other gases may be used instead of ammonia gas, it being understood that the treating gas and aqueous solution should be selected so as to react together to form insoluble deposits or precipitates which at least partially obstruct or block the pore spaces or channels of the formulation. If the proprieties of the gas are such that it is in the gaseous state at the temperature and pressure existing in the formation, dilution with an inert gas to prevent condensation will not be required.

The following are examples of other aqueous metal salt solutions and treating gases which may be employed:

(1) A lead acetate solution followed by hydrogen sulfide gas forms a lead sulfide precipitate.

(2) A barium chloride solution followed by sulfur trioxide gas forms a barium sulfate precipitate.

The effectiveness of the plugging deposits or precipitates formed in accordance with the invention is shown by laboratory tests which have been conducted. In one laboratory test, an aqueous solution of aluminum sulfate followed by ammonia gas were injected into a sand body that prior to treatment passed 29.2 cc. of air per minute under a given injection pressure. After treatment, the sand body passed only 0.17 cc. of air under the same injection pressure.

The process of this invention was used in shutting off water flowing into the bore hole of a well in the following manner:

A well was drilled to a total depth of 1,259 feet through a series of water-bearing strata. The well had a diameter of 7⅞ inches. The interval from 902 to 910 feet was isolated by means of straddle packers and the rate of water production determined by swabbing water from the well. It was found that eight gallons per minute of water entered the well through the interval tested. Fluids were then injected into the well in the following order:

(1) 220 gallons of a concentrated aqueous solution of aluminum sulfate solution containing six pounds of

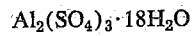

per gallon
(2) A slug of water
(3) 900 standard cubic feet of natural gas plus 300 standard cubic feet of ammonia as a mixture
(4) A slug of water
(5) 220 gallons of the concentrated aluminum sulfate solution
(6) A slug of water
(7) 800 standard cubic feet of natural gas plus 150 standard cubic feet of ammonia as a mixture
(8) A slug of water
(9) 55 gallons of the aluminum sulfate solution
(10) 120 gallons of water The well was than swabbed and recovered salt water at the rate of 4.5 gallons per minute. Fluids were then injected into the well in the following order:

(11) 220 gallons of an aqueous solution of aluminum sulfate containing six pounds of $Al_2(SO_4)_3 \cdot 18H_2O$ per gallon
(12) A slug of water
(13) 1000 standard cubic feet of natural gas and 225 standard cubic feet of ammonia as a mixture
(14) 200 standard cubic feet of natural gas
(15) 220 gallons of the aluminum sulfate solution
(16) 130 standard cubic feet of natural gas
(17) 1400 standard cubic feet of natural gas and 200 standard cubic feet of ammonia as a mixture
(18) 360 standard cubic feet of natural gas
(19) 55 gallons of the aluminum sulfate solution After release of pressure, the well was swabbed. A complete shut off of water flow into the well from the interval treated was obtained.

As stated hereinbefore, the invention has particular advantages when used in connection with the gas repressuring of oil fields. Laboratory tests have indicated that if the aqueous solution is injected under relatively low pressures, as previously noted, it is possible to cause a very high percentage of the solution to enter the zones of high permeability. This is advantageous since the treating gas which reacts with the solution tends to enter the more permeable zones. In gas repressuring operations, it is desirable to reduce the permeability of the more permeable zones in order to prevent or reduce the injected gas from entering these zones and by-passing less permeable zones which still contain oil.

Also, since the deposits or precipitates are formed after the ammonia or other treating gas contacts the aqueous solution, which occurs generally throughout the more permeable zones and generally at greater distances into the formation than with methods heretofore used, there is much less likelihood that the injection gas subsequently introduced will be allowed to escape into zones of higher permeability by vertical migration after entering zones of less permeability.

Furthermore, although the ammonia or other treating gas displaces or moves the aqueous solution to a certain extent as it is injected into the formation, there is much less tendency toward such behavior than where a second aqueous solution, for example, is injected and used as a treating reagent to form deposits or precipitates. The gas fingers through the aqueous solution to form precipitate for a substantial depth into the formation. In contrast, a second liquid reacts substantially only at the interface of the two liquids.

It is understood that various modifications and alterations may be made in the method disclosed herein without departing from the spirit of the invention, which is best defined by the scope of the appended claims.

This application is a continuation-in-part of our application Serial No. 490,674, filed February 25, 1955, now abandoned.

We claim:

1. A process for plugging a permeable formation penetrated by a borehole of a well for the production of hydrocarbon fluids comprising displacing down the borehole and injecting into the formation an aqueous solution of a metal salt, and then displacing down the borehole and injecting into the formation a mixture of an inert gas and a reactant gas that will react with the metal salt to form an insoluble precipitate containing the metal ion of the salt, the proportion of inert gas being such that the mixture of gases remains in the gaseous state at the conditions existing in the permeable formation.

2. A process as set forth in claim 1 in which the solution is aluminum sulfate, the inert gas is nitrogen, and the gas that reacts with the metal salt solution is ammonia.

3. A process as set forth in claim 1 in which the solution is aluminum sulfate, the inert gas is a hydrocarbon gas, and the gas that reacts with the metal salt solution is ammonia.

4. A process as set forth in claim 1 in which the aqueous solution is a solution of lead acetate and the reactant gas is hydrogen sulfide.

5. A process as set forth in claim 1 in which the aqueous solution is a solution of barium chloride and the reactant gas is sulfur trioxide.

6. A process for plugging a permeable formation penetrated by the borehole of a well comprising injecting down the bore hole and into the formation an aqueous solution of a metal salt reactable with a reactant gas to form an insoluble precipitate containing the metal ion of the salt, displacing aqueous solution which remains in the borehole from the borehole into the formation, then injecting a mixture of a permanent gas and the reactant gas down the borehole and into the formation, the proportion of permanent gas and reactant gas in the mixture being such that the partial pressure of the reactant gas in the mixture is less than the vapor pressure of the reactant gas at the temperature existing in the formation.

7. A process for plugging a permeable formation penetrated by a borehole comprising injecting an aqueous solution of aluminum sulfate down the borehole and into the formation, displacing aqueous solution of aluminum sulfate which remains in the borehole from the borehole with an inert gas, and injecting a gaseous mixture of ammonia and an inert gas into the formation whereby the ammonia reacts with aluminum sulfate to form an insoluble precipitate plugging the permeable formation, the proportions of inert gas and ammonia in the gaseous mixture being such that the partial pressure of the ammonia in the gaseous mixture is lower than the vapor pressure of ammonia at the temperature of the formation.

References Cited in the file of this patent

UNITED STATES PATENTS

| | | |
|---|---|---|
| 1,421,706 | Mills | July 4, 1922 |
| 1,815,876 | Muller | July 21, 1931 |
| 2,029,649 | Ayres | Feb. 4, 1936 |
| 2,272,672 | Kennedy | Feb. 10, 1942 |
| 2,361,012 | Cole et al. | Oct. 24, 1944 |
| 2,837,163 | Ramos et al. | June 3, 1958 |